US012155962B2

(12) United States Patent
Watanabe

(10) Patent No.: US 12,155,962 B2
(45) Date of Patent: Nov. 26, 2024

(54) IMAGE PICKUP APPARATUS HAVING FUNCTION OF RECORDING VOICE DATA, CONTROL METHOD FOR IMAGE PICKUP APPARATUS, AND STORAGE MEDIUM

(71) Applicant: CANON KABUSHIKI KAISHA, Tokyo (JP)

(72) Inventor: Shinsaku Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 17/710,583

(22) Filed: Mar. 31, 2022

(65) Prior Publication Data

US 2022/0329752 A1 Oct. 13, 2022

(30) Foreign Application Priority Data

Apr. 7, 2021 (JP) .................... 2021-065268

(51) Int. Cl.
| | |
|---|---|
| *H04N 5/92* | (2006.01) |
| *G06F 3/01* | (2006.01) |
| *G06F 3/16* | (2006.01) |
| *G10L 25/57* | (2013.01) |
| *H04N 23/63* | (2023.01) |
| *H04N 23/667* | (2023.01) |
| *H04R 1/02* | (2006.01) |
| *H04R 1/08* | (2006.01) |
| *H04R 3/00* | (2006.01) |

(52) U.S. Cl.
CPC .......... *H04N 5/9202* (2013.01); *G06F 3/013* (2013.01); *G06F 3/165* (2013.01); *G10L 25/57* (2013.01); *H04N 23/63* (2023.01); *H04N 23/667* (2023.01); *H04R 1/028* (2013.01); *H04R 1/08* (2013.01); *H04R 3/00* (2013.01); *H04R 2499/11* (2013.01)

(58) Field of Classification Search
USPC ......................................... 386/285
See application file for complete search history.

(56) References Cited

U.S. PATENT DOCUMENTS

| | | | |
|---|---|---|---|
| 2021/0240988 A1* | 8/2021 | Lim ................. | G08B 21/18 |
| 2021/0266390 A1* | 8/2021 | Grajales .......... | H04L 67/12 |
| 2022/0313085 A1* | 10/2022 | Kessler ........... | A61B 3/14 |
| 2022/0340079 A1* | 10/2022 | Yang ............... | G08B 21/06 |
| 2022/0369976 A1* | 11/2022 | Abbas ............. | A61B 5/7264 |

FOREIGN PATENT DOCUMENTS

JP 2010109614 A 5/2010

* cited by examiner

*Primary Examiner* — Nigar Chowdhury
(74) *Attorney, Agent, or Firm* — Canon U.S.A., Inc. IP Division

(57) ABSTRACT

An image pickup apparatus which reduces variations in volume of voice data recorded by a voice memo function without increasing the number of components therein. The image pickup apparatus, having a first and a second display part, determines a display destination of image data according to a detection result of an eye approach detection part, and performs synthesis processing of adding voice data recorded by a sound collecting member to the image data, wherein in a case where user's eye approach is detected by the eye approach detection part and the image data is displayed on the second display part, when voice recording is started by a user operation, a first sound collecting sensitivity adjustment process of adjusting a sound collecting sensitivity of the sound collecting member is performed.

7 Claims, 5 Drawing Sheets

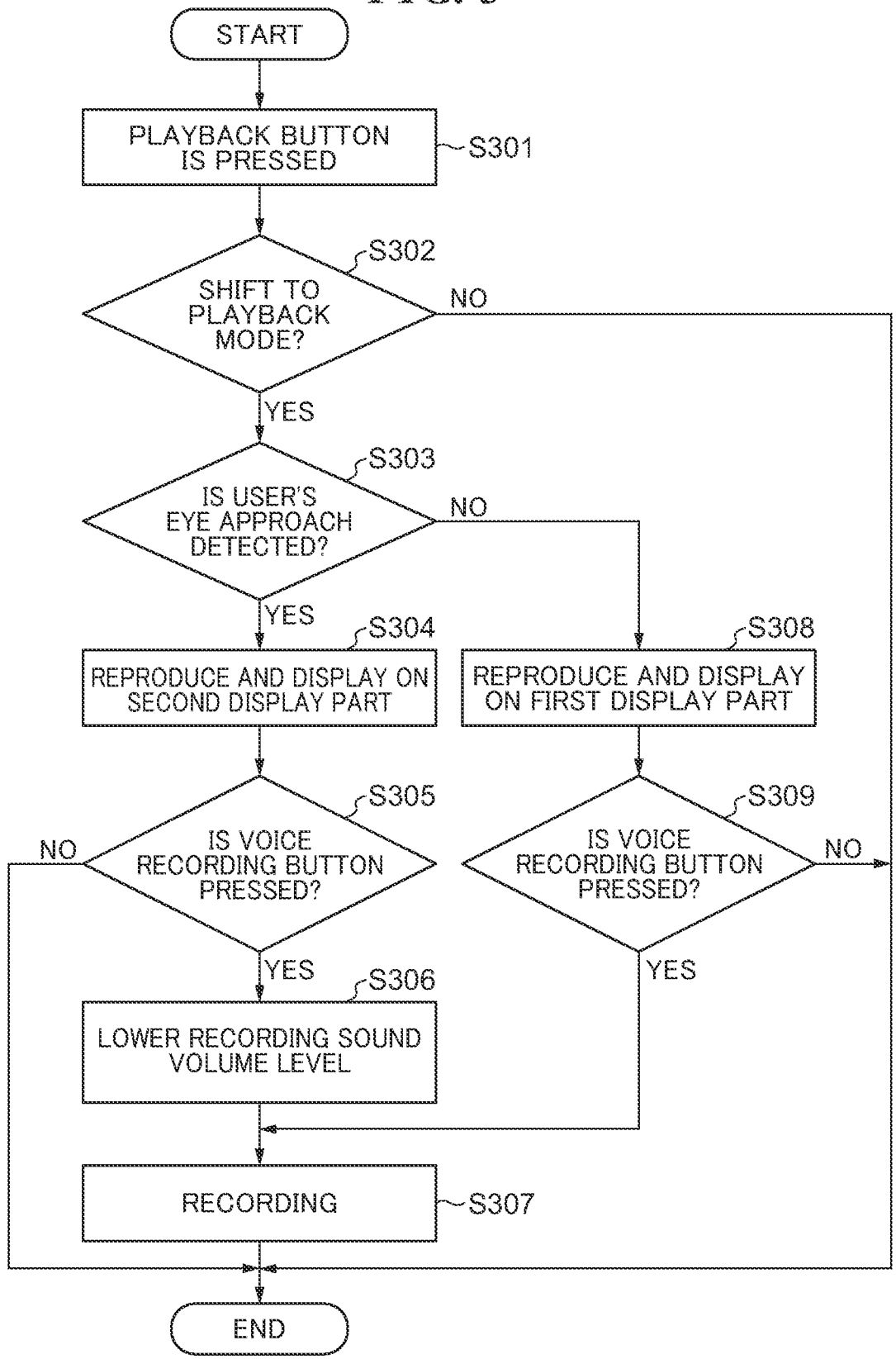

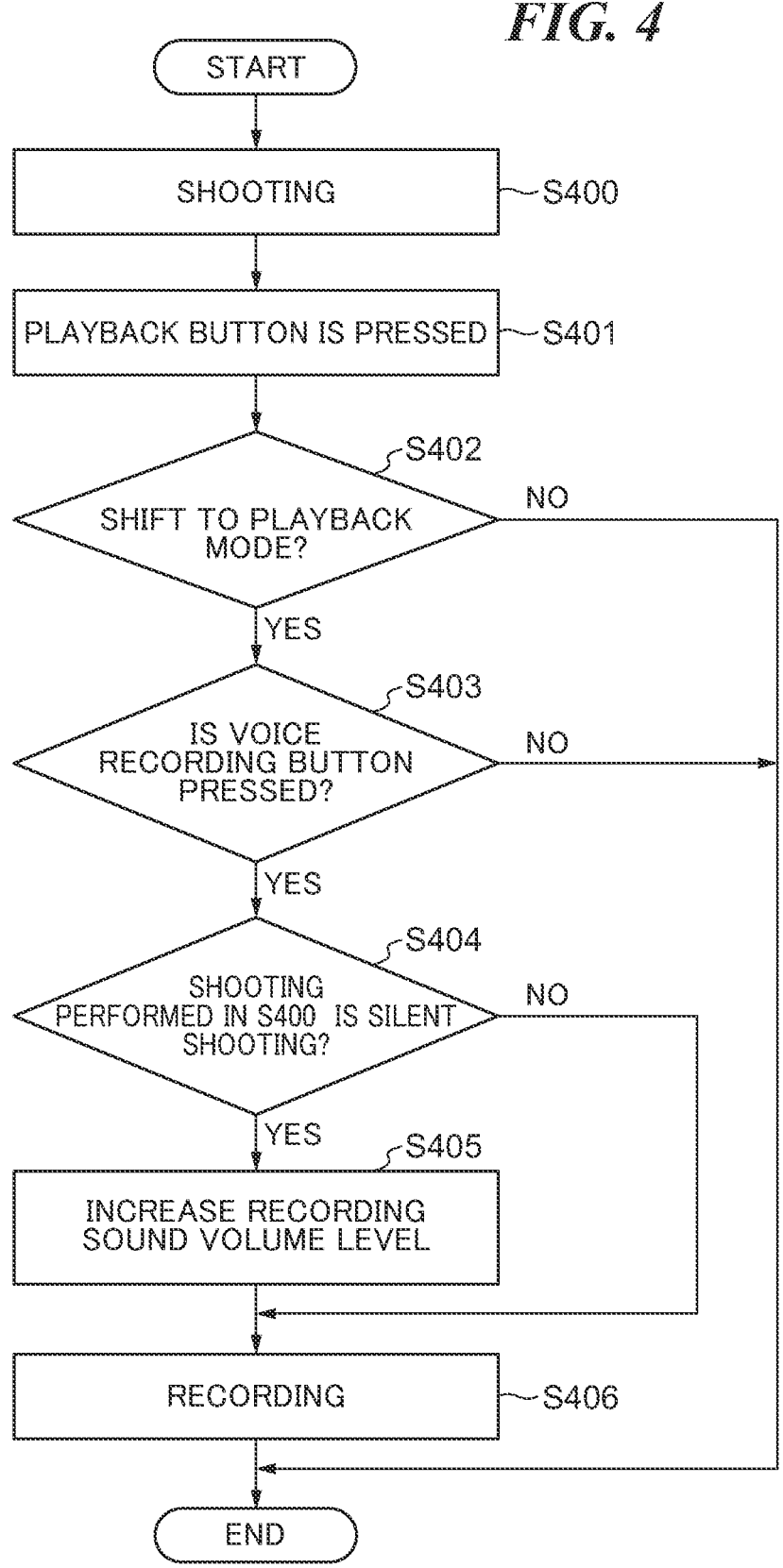

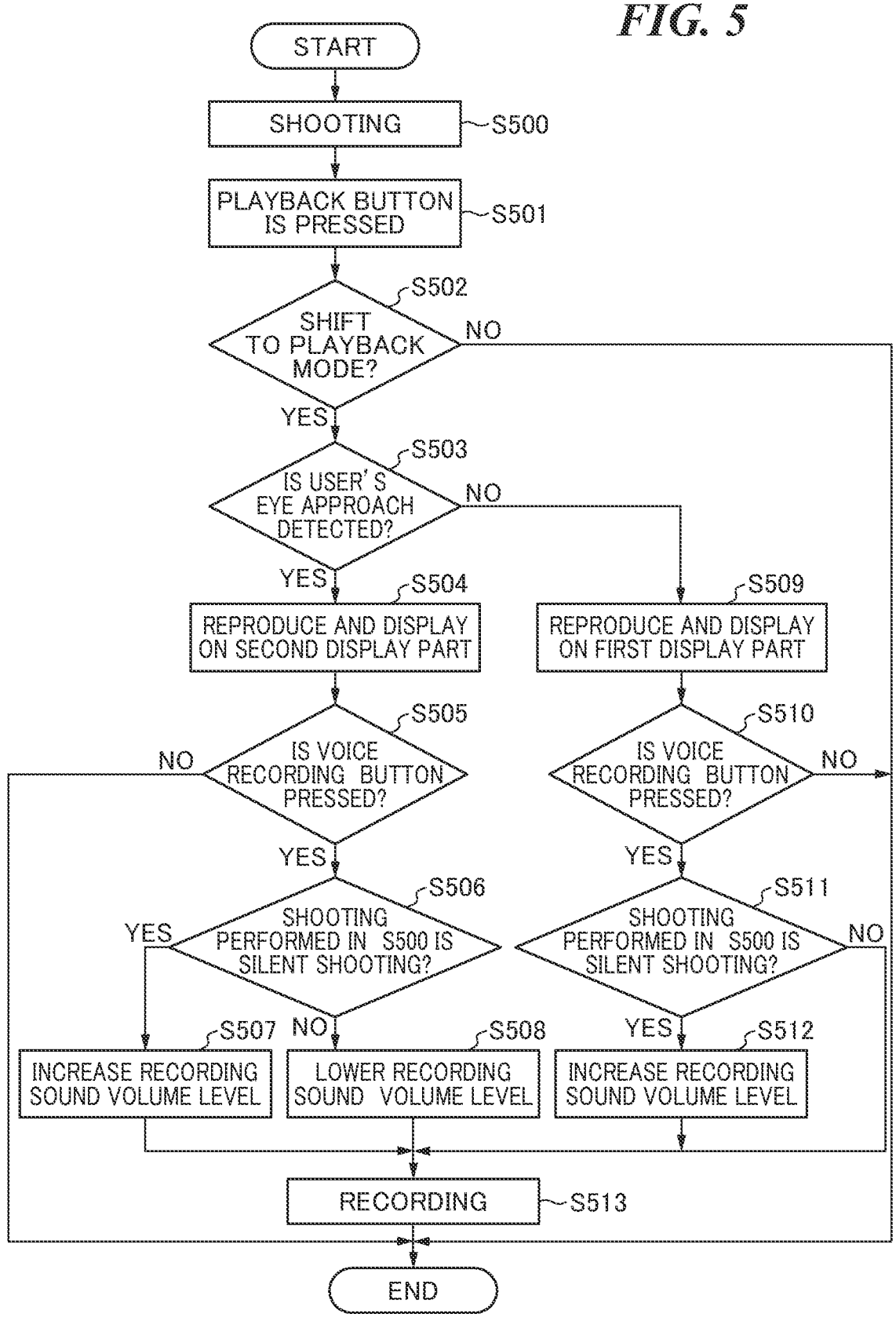

IMAGE PICKUP APPARATUS HAVING FUNCTION OF RECORDING VOICE DATA, CONTROL METHOD FOR IMAGE PICKUP APPARATUS, AND STORAGE MEDIUM

BACKGROUND

Field of the Disclosure

The present disclosure relates to an image pickup apparatus having a function of recording voice data, a control method for the image pickup apparatus, and a storage medium.

Description of the Related Art

Conventionally, an image pickup apparatus (for example, a digital camera) that records image data obtained by performing necessary image processing on an imaging signal (raw image signal) output from an image pickup device, and information regarding the image data (hereinafter, referred to as "image information") as a data file has been widely used. Specifically, the image pickup apparatus forms an optical image on the image pickup device via a shooting lens, and photoelectrically converts the formed optical image by the image pickup device to obtain a raw image signal. Then, necessary image processing is performed on the obtained raw image signal, and image data in a predetermined file format obtained by the image processing is recorded (saved) in a recording medium. The predetermined file format (image storage format) may be, for example, a JPEG format.

As such an image pickup apparatus, there is an image pickup apparatus capable of capturing not only a still image but also a moving image including sound and equipped with a microphone for recording sound is widely used. In addition, some image pickup apparatus equipped with a microphone are equipped with a voice memo function capable of adding voice data to image data later. The image pickup apparatus equipped with the voice memo function also has a microphone (hereinafter, referred to as a "microphone for user voice recording") for recording a voice of a photographer/videographer who operates the image pickup apparatus, in addition to a microphone (hereinafter, referred to as a "subject voice recording microphone") for recording a voice of a subject.

Hereinafter, a photographer/videographer who operates the image pickup apparatus is referred to as a "user". Further, the image data recorded (saved) in the recording medium is simply referred to as "image data". The image data in a predetermined file format acquired for recording (saving) on the recording medium (that is, the image data for recording) is also referred to as "image data". Further, the image data may be still image data or moving image data.

On the other hand, in recent years, image pickup apparatus having a plurality of display parts such as a liquid crystal display (hereinafter, also referred to as "LCD") and an electronic viewfinder (hereinafter, also referred to as "EVF") on the back side have been widely used. The EVF is a display part that is used by a user looking into with their eye. In the image pickup apparatus having the LCD and the EVF, the image data can be reproduced and displayed selectively on both the LCD or the EVF.

By the way, when the user adds voice data to the image data using the voice memo function, a distance between the image pickup apparatus and a face of the user varies depending on whether the image data is being reproduced and displayed on the LCD or the EVF. Therefore, the volume of the voice data to be recorded varies depending on which of the LCD and the EVF reproduces and displays the image data. That is, when recording is performed by the voice memo function, a sound volume of the voice data to be recorded (hereinafter, also referred to as "recording volume") varies depending on a user's posture in which the user confirms image data reproduced and displayed on the LCD or the EVF (hereinafter, it is also referred to as an "image confirmation posture").

As a related technique, a technique of Japanese Laid-Open Patent Publication (kokai) No. 2010-109614 is proposed. According to the technique disclosed in Japanese Laid-Open Patent Publication (kokai) No. 2010-109614, a recording apparatus capable of recording sounds of a plurality of scenes has a plurality of microphones having different directivities, and the microphones are switched according to a scene selected by a user. However, in the technique disclosed in Japanese Laid-Open Patent Publication (kokai) No. 2010-109614, it is necessary to provide a plurality of microphones as sound collecting members in the recording apparatus, which causes problems of an increase in the number of components and an increase in cost of the apparatus.

SUMMARY

The present disclosure provides an image pickup apparatus, a controlling method for the image pickup apparatus, and a storage medium, capable of reducing variations in volume of voice data recorded by a voice memo function without increasing the number of components in the apparatus.

Accordingly, the present disclosure provides an image pickup apparatus, comprising a first display part, a second display part, an eye approach detection part configured to detect user's eye approach which means that a user looks into the second display part and the user's eye approaches the second display part, a sound collecting member configured to collect and record a voice of the user, a start member operable by the user to start and execute voice recording by the sound collecting member, at least one memory that stores a set of instructions, and at least one processor that is configured to, based on the instructions, perform to determine a display destination of image data according to a detection result of the eye approach detection part, perform synthesis processing of adding voice data recorded by the sound collecting member to the image data, and start and execute voice recording by the sound collecting member in response to an instruction by a user operation on the start member, wherein in a case where user's eye approach is detected by the eye approach detection part and the image data is displayed on the second display part, when the voice recording is started by the user operation on the start member, the at least one processor performs a first sound collecting sensitivity adjustment process of adjusting a sound collecting sensitivity of the sound collecting member.

According to the present disclosure, it is possible to reduce variations in volume of voice data recorded by the voice memo function without increasing the number of the components in the apparatus.

Further features of the present disclosure will become apparent from the following description of exemplary embodiments (with reference to the attached drawings).

BRIEF DESCRIPTION OF THE DRAWINGS

FIG. 1A is a perspective view of the image pickup apparatus as viewed from a front side, and FIG. 1B is a perspective view of the image pickup apparatus as viewed from a rear side.

FIG. 3 is a flowchart showing an operation of the image pickup apparatus according to one or more aspects of the present disclosure.

FIG. 4 is a flowchart showing an operation of the image pickup apparatus according to one or more aspects of the present disclosure.

FIG. 5 is a flowchart showing an operation of an image pickup apparatus according to one or more aspects of the present disclosure.

DESCRIPTION OF THE EMBODIMENTS

The present disclosure will now be described in detail below with reference to the accompanying drawings showing embodiments thereof.

First Embodiment

Figure 1A:
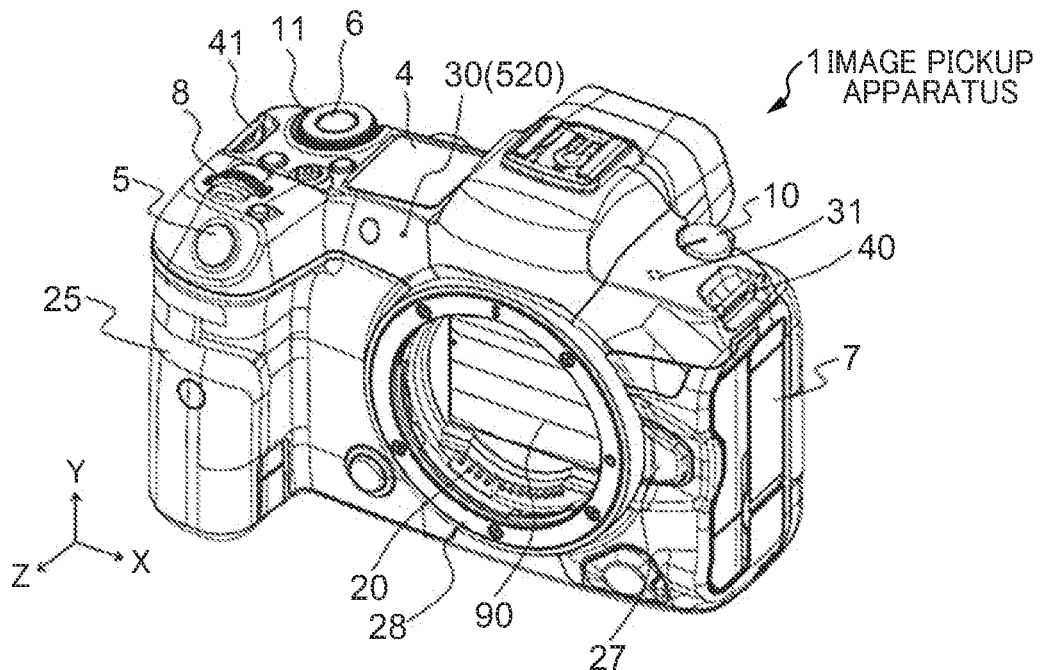
FIGS. 1A and 1B are diagrams showing an example of an appearance of an image pickup apparatus according to one or more aspects of the present disclosure.
Figure 1B:
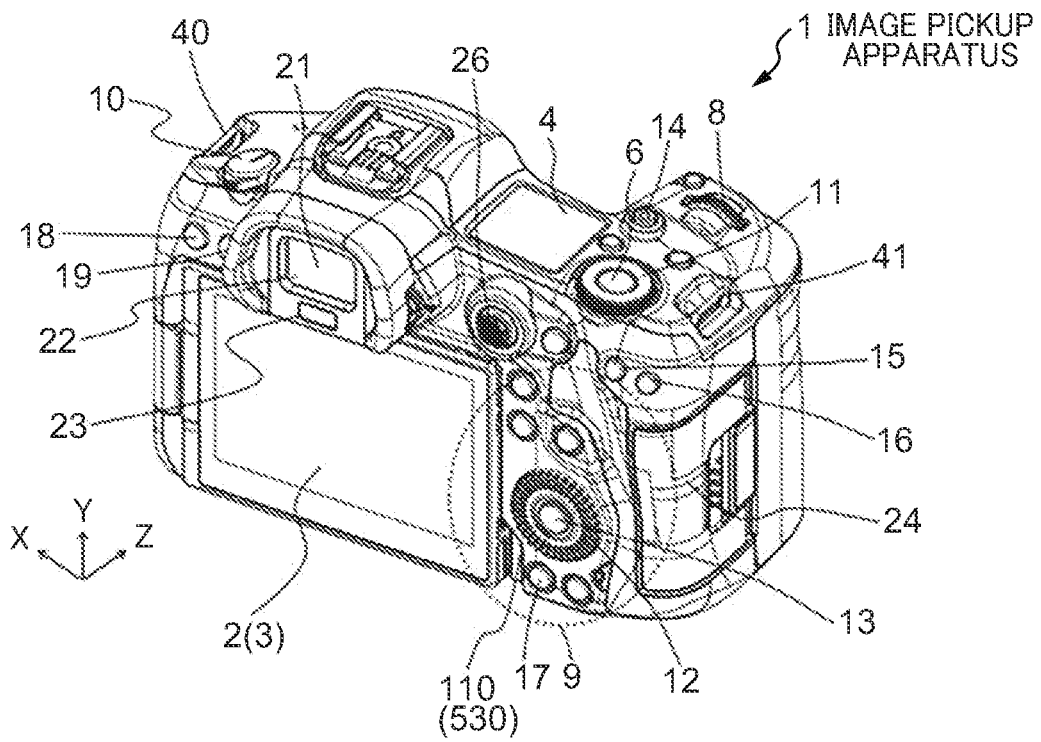

FIGS. 1A and 1B are diagrams showing an example of an appearance of an image pickup apparatus 1 according to a first embodiment of the present disclosure, wherein FIG. 1A is a perspective view of the image pickup apparatus 1 as viewed from the front side, and FIG. 1B is a perspective view of the image pickup apparatus 1 as viewed from the rear side. It should be noted that, in the description using the drawings, "left" and "right" correspond to the left and right of the image pickup apparatus 1 recognized when the user holds the image pickup apparatus 1 at a lateral position. That is, in FIGS. 1A and 1B, a −X direction is the right, and a +X direction is the left.

As shown in FIGS. 1A and 1B, the image pickup apparatus 1 according to the first embodiment of the present disclosure is a lens-interchangeable-type image pickup apparatus, and is, for example, a lens-interchangeable-type digital camera such as a digital mirrorless single-lens camera or a digital single-lens reflex camera. An image pickup apparatus 1 according to a first embodiment of the present disclosure includes a voice memo function capable of adding voice data to image data being reproduced and displayed (that is, image data displayed in a playback mode). An outer viewfinder display part 4 is provided on the top of the image pickup apparatus 1. The outer viewfinder display part 4 is a display part that displays various set values of the image pickup apparatus 1 including a shutter speed and a diaphragm. A grip part 25 for a photographer/videographer (a user) gripping the image pickup apparatus 1 is formed on a right side part of the image pickup apparatus 1. The grip part 25 is formed in a shape that is easy for the photographer/videographer to grip with a right hand when the photographer/videographer holding the image pickup apparatus 1 at the lateral position. A lid 24 is provided on a wall of the grip part 25, and the lid 24 is a lid that covers a slot for accommodating a recording medium (not shown).

A shutter button 5 and a main electronic dial 8 are arranged at positions where the user can operate them with an index finger of the right hand while holding the image pickup apparatus 1 by gripping the grip part 25 with a little finger, ring finger, and middle finger of the right hand. The shutter button 5 is an operation part for receiving a shooting instruction from the user. A main electronic dial 8 is a rotation operation member, and the user can change set values of, for example, a shutter speed and a diaphragm by rotating the main electronic dial 8.

Further, a sub-electronic dial 11 and a selection member 26 are arranged at positions where the user can operate them with a thumb of the right hand while holding the image pickup apparatus 1 at the lateral position. The sub-electronic dial 11 is a rotation operation member for instructing movement of a selection frame, image feeding, and the like in a display by a display part 2 and the like. The selection member 26 is a cross key (four-way key) depressable at each of upper, lower, left, and right parts, and can perform an operation corresponding to a pressed part of the four-way key.

A mode selector switch 6 is disposed at a center of the sub-electronic dial 11. The mode selector switch 6 is an operation part for switching various modes. A moving image button 14 is disposed between the main electronic dial 8 and the mode selector switch 6. The moving image button 14 is used to instruct start/stop of moving image shooting (moving image recording).

A terminal cover 7 is provided on a left side surface (a side opposite to the grip part 25) of the image pickup apparatus 1. The terminal cover 7 is a cover for protecting a connector (not shown) such as a connection cable for connecting an external device and the image pickup apparatus 1. A power switch 10 is arranged on a left side of the top of the image pickup apparatus 1. The power switch 10 is an operation member for switching on/off of power supply of the image pickup apparatus 1.

The display part 2 is provided on a back surface of the image pickup apparatus 1. The display part 2 is a display part for displaying various types of information including image data and image information, and consists of, for example, a liquid crystal display (LCD). A display surface (that is, an operation surface) of the display part 2 is a touch panel 3. A touch operation on the touch panel 3 which is a display surface (operation surface) of the display part 2 is detected by an operation detection part 286, which will be described later.

An operation part 9 is provided on a right of the display part 2 so as to be adjacent to the display part 2. The operation part 9 includes a plurality of push buttons and an operation dial 12. The operation dial 12 is a rotary operation member, and the user can change set values of a shutter speed, a diaphragm and the like by rotating the operation dial 12. A SET button 13 is disposed at a center of the operation dial 12. The SET button 13 is a push button, and is mainly used to determine a selected item.

A playback button 17 is disposed below the operation dial 12. The playback button 17 is an operation button for switching a mode between a shooting mode and the playback mode. By pressing the playback button 17 during the shooting mode (in a situation where shooting by the user is being performed), the mode shifts to the playback mode, and a latest image data among the image data recorded (saved) on the recording medium (not shown) can be displayed on the display part 2. Further, by pressing the playback button 17 in a case where shooting by the user is not performed, the mode shifts to the playback mode, and image data selected by the user using an operation member from the image data recorded (saved) on the recording medium can be displayed on the display part 2. The recording medium corresponds to a storage part 284 to be described later.

An automatic exposure (AE) lock button 15 is disposed above the operation part 9. The exposure state can be fixed by pressing the AE lock button 15 in a shooting standby state. An enlargement button 16 is disposed above the operation part 9 so as to be adjacent to the AE lock button 15. The enlargement button 16 is an operation button for turning on/off the enlargement mode in a live view display of the shooting mode. By turning on the enlargement mode with the enlargement button 16 and then operating the main electronic dial 8, a live view image can be enlarged or reduced. In addition, the enlargement button 16 functions as an enlargement button for enlarging an image (reproduced image) displayed on the display part 2 in the playback mode and increasing an enlargement ratio.

An EVF 22 is provided above the display part 2. The EVF 22 is a looking-in type electronic viewfinder, and has an eyepiece part 21. The user can visually recognize an image displayed on a small display part (not shown) configured in the EVF 22, through the eyepiece part 21. Hereinafter, "the image displayed on the small display part configured in the EVF 22" is simply referred to as "the image displayed on the EVF 22" while the EVF 22 and the small display part configured in the EVF 22 are not particularly distinguished.

An eye approach detection part 23 may be disposed near the EVF 22. In the first embodiment, the eye approach detection part 23 is disposed below the EVF 22 so as to be adjacent to the EVF 22. Further, the eye approach detection part 23 is configured to be able to detect whether or not the user is looking through the eyepiece part 21, as an eye approach detection unit (eye approach detection part), and for example, the eye approach detection part 23 may be configured with an eye approach detection sensor. In the image pickup apparatus 1, when the eye approach detection part 23 detects that "the user is looking through the eyepiece part 21", indication on the display part 2 is turned off, and the display is switched to a display of the EVF 22. Hereinafter, "the user is looking through the eyepiece part 21" is simply referred to as "user's eye approach". That is, in the image pickup apparatus 1, when detecting the user's eye approach, the eye approach detection part 23 outputs a user eye approach detection signal indicating that the user's eye approach is detected to a camera system control part 281 to be described later. On the other hand, when not detecting the user's eye approach, the eye approach detection part 23 does not output the user eye approach detection signal to the camera system control part 281.

A menu button 19 is arranged on a left of the eyepiece part 21. The menu button 19 is a push button, and when the menu button 19 is pressed, a menu screen through which various settings can be made is displayed on the display part 2. The user can intuitively perform various settings using the menu screen displayed on the display part 2, and the operation dial 12 and/or the SET button 13. A voice recording button 18 is arranged on a left of the menu button 19 so as to be adjacent to the menu button 19. The voice recording button 18 is a push button as an execution unit that performs recording by the voice memo function to adding voice data to the image data being reproduced and displayed in the playback mode (hereinafter, simply referred to as "voice memo recording"). Furthermore, the voice recording button 18 is also a voice memo recording start button as a start unit (start member, or execution member) for starting voice memo recording (that is, recording of voice of the user).

Hereinafter, the "image data obtained by adding voice data to image data using the voice memo function afterwards" is referred to as "image data with voice memo" or "sound accompanying image data". In the playback mode, while the user selects and displays image data to which voice data is desired to be attached, and keeps pressing the voice recording button 18, the user's own voice is collected and recorded by a user voice recording microphone 530 disposed inside a microphone hole 110 as a sound collection hole. A user voice recording microphone 530 is provided on a back surface of the image pickup apparatus 1. More specifically, while visually recognizing the image data (image) reproduced and displayed in the playback mode, the user can add the user's own voice to the image, as a voice memo including any information related to the image, such as information regarding a shooting state and information regarding a subject information of the image. As a result, at the time of confirming the subsequent image data, that is, when the user confirms the sound accompanying image data later, the user can easily grasp any information regarding the image by the recorded voice in the sound accompanying image data.

A lens mount part 28 is provided on a front surface of the image pickup apparatus 1. The lens mount part 28 is a part to which a lens apparatus (interchangeable-type lens apparatus) detachable from the image pickup apparatus 1 is attached. A communication terminal 20 is disposed inside the lens mount part 28. The communication terminal 20 is a terminal for performing communication between the image pickup apparatus 1 and the lens apparatus.

A lock button 27 is disposed on a left of the diameter center part of the lens mount part 28 so as to be adjacent to the lens mount part 28. When the lens apparatus is attached to the image pickup apparatus 1, a holding lock mechanism (not shown) functions. By the lock button 27 being pressed, the holding lock mechanism is released, and the lens apparatus can be removed.

Various lenses as a detachable lens apparatus, such as a full-size compatible lens capable of exposing the entire effective area of an image pickup device 90, and an APS-C compatible lens which is a lens with format of a small exposure area can be mounted on the image pickup apparatus 1. The image pickup device 90 is an image sensor that converts an optical image into an electrical signal, and for example, the image pickup device 90 is a so-called 35 mm full-size CMOS sensor having an effective area of approximately 24 mm×36 mm.

A microphone hole 30 is arranged in the front surface of the image pickup apparatus 1 and in an upper right of the lens mount part 28. A subject voice recording microphone 520 as a sound collecting member is disposed inside the microphone hole 30. The subject voice recording microphone 520 is used to collect and record voice of the subject during shooting of moving images (moving pictures). In addition, a speaker hole 31 is arranged in the front surface of the image pickup apparatus 1 and in an upper left of the lens mount part 28. A speaker (not shown) is disposed inside the speaker hole 31, and the speaker is used to reproduce sound of image data and sound built in the image pickup apparatus 1.

Furthermore, strap insertion members 40 and 41 are provided on the left and right shoulders of the image pickup apparatus 1, respectively. The user can hang and carry the image pickup apparatus 1 by using a string-like member (not shown) such as a strap inserted into the strap insertion members 40 and 41.

Figure 2:
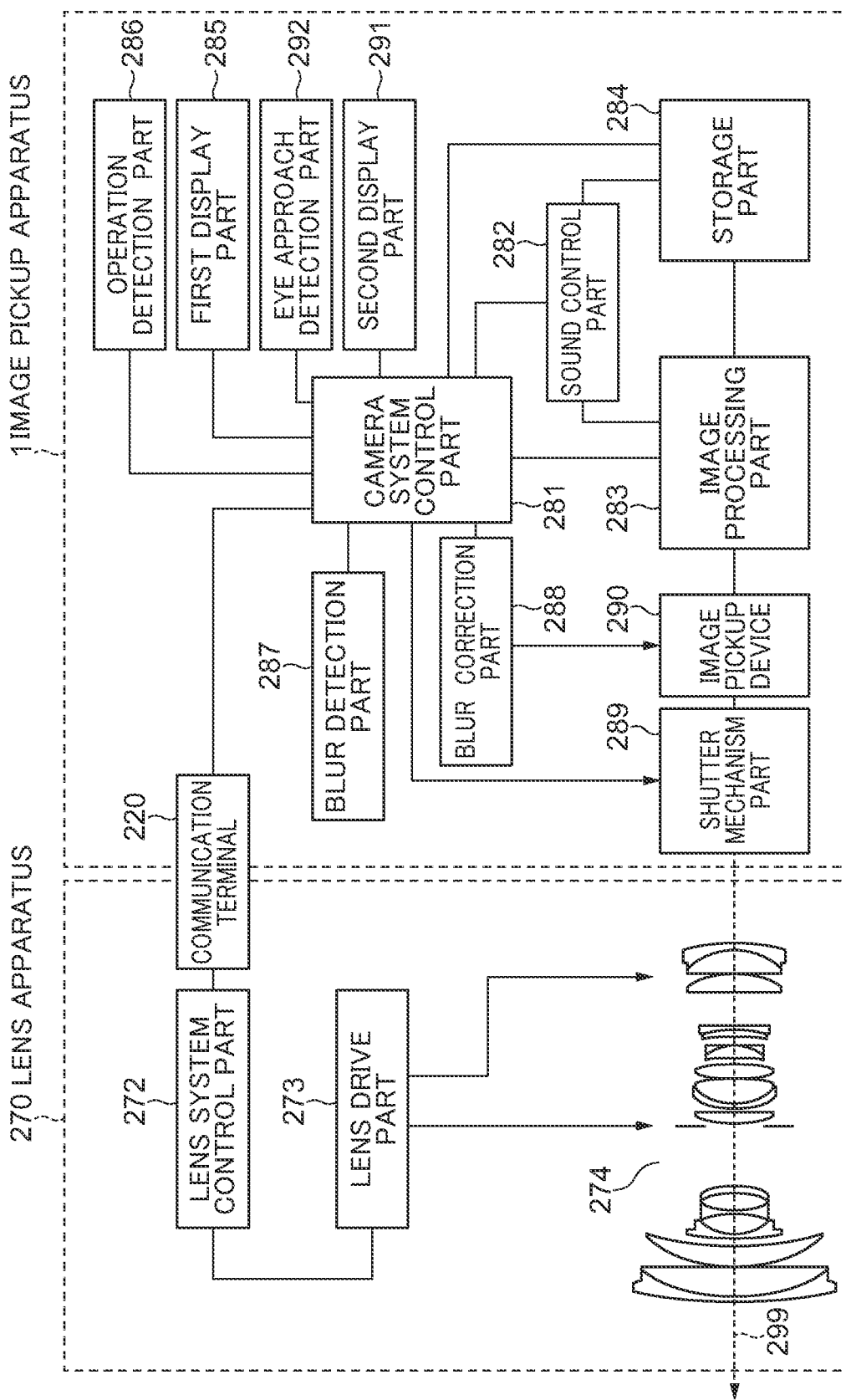
FIG. 2 is a block diagram showing an overall configuration example of an image pickup system in a case where an interchangeable-type lens apparatus is attached to the image pickup apparatus of FIG. 1.

Next, an overall configuration of an image pickup system including the image pickup apparatus 1 according to the first embodiment of the present disclosure and an interchangeable-type lens apparatus 270 will be described with reference to FIG. 2. FIG. 2 is a block diagram showing an overall configuration example of an image pickup system in a case where an interchangeable-type lens apparatus 270 is attached to the image pickup apparatus 1 of FIG. 1.

As shown in FIG. 2, the image pickup system consists of an interchangeable-lens-type image pickup apparatus 1 and a lens apparatus 270 which is a interchangeable-type lens, and the image pickup system is, for example, an interchangeable-lens-type digital camera on which an interchangeable lens is mounted.

The lens apparatus 270 includes a lens system control part 272, a lens drive part 273, and an image pickup optical system 274. The image pickup optical system 274 includes a plurality of lenses such as a focus lens and a zoom lens and a diaphragm, wherein an optical axis of the image pickup optical system 274 is indicated by reference numeral 299. The lens system control part 272, as a lens system control unit, controls operation of the entire lens apparatus 270. The lens drive part 273 drives a plurality of lenses such as a focus lens and a zoom lens and a diaphragm according to a control command signal from the lens system control part 272.

The image pickup apparatus 1 includes the camera system control part 281, a sound control part 282, an image processing part 283, the storage part 284, a first display part 285, the operation detection part 286, a blur detection part 287, a blur correction part 288, and a shutter mechanism part 289. The image pickup apparatus 1 further includes an image pickup device 290, a second display part 291, and an eye approach detection part 292. The camera system control part 281 is connected to each of the image processing part 283, the sound control part 282, the first display part 285, the second display part 291, the operation detection part 286, the blur detection part 287, the blur correction part 288, and the shutter mechanism part 289. Furthermore, the camera system control part 281 is connected to the image pickup device 290 via the blur correction part 288. The camera system control part 281 is connected to the storage part 284 via the sound control part 282 and the image processing part 283. Furthermore, the camera system control part 281 is connected to the image processing part 283 and the storage part 284 each, directly and also via the sound control part 282. The camera system control part 281 is also connected to the lens system control part 272 of the lens apparatus 270 via a communication terminal 220.

The camera system control part 281, as a control unit, controls the operation of the entire image pickup system consisting of the image pickup apparatus 1 and the lens apparatus 270. Furthermore, the operation detection part 286, as a user operation detection unit, is configured to detect an operation by the user reflecting the user instruction, and outputs a user operation signal corresponding to the detected operation to the camera system control part 281 when detecting the operation by the user. The camera system control part 281 integrally controls operation of each part of the image pickup apparatus 1 and the lens apparatus 270 in accordance with a user operation signal (hereinafter, simply referred to as an "operation signal") output from the operation detection part 286. The user operation signal is a signal reflecting a user instruction such as a shooting instruction, that is, a signal corresponding to an operation by the user (hereinafter, simply referred to as "user operation"). The camera system control part 281 may be configured with a central processing unit (CPU). The camera system control part 281 configured with a CPU executes a predetermined computer program to integrally control operation of each part of the image pickup system and perform various processes in the image pickup system. Furthermore, the camera system control part 281 is communicatable with the lens system control part 272 connected via the communication terminal 220.

The image pickup device 290 receives light from a subject via the image pickup optical system 274 and the shutter mechanism part 289 to acquire an optical image (subject image), converts the acquired optical image into an electric signal (raw image signal) by photoelectric conversion, and outputs the electric signal. The image processing part 283 acquires a raw image signal output from the image pickup device 290, and performs necessary image processing such as digital development processing on the acquired raw image signal. The image data obtained by the image processing is stored (recorded) in the storage part 284. The shutter mechanism part 289 is disposed on the subject side with respect to the image pickup device 290, and is used to control the exposure time of the image pickup device 290.

The blur detection part 287 performs blur detection processing for detecting a blur of the image pickup apparatus 1 due to camera shake or the like. Specifically, the blur detection part 287 is configured to detect rotation about an optical axis 299 as a central axis, and detects rotational blur of the image pickup apparatus 1 in a pitch direction, yaw direction, and roll direction. For example, the blur detection part 287 performs blur detection processing using a gyro sensor, and outputs a blur detection signal indicating that the blur of the image pickup apparatus 1 is detected to the camera system control part 281, when detecting a blur of the image pickup apparatus 1. On the other hand, the blur detection part 287 does not output the blur detection signal to the camera system control part 281 in a case where the blur of the image pickup apparatus 1 is not detected.

The blur correction part 288 corrects an image blur of the subject image. Specifically, the blur correction part 288 performs the image blur correction operation according to a control command signal from the camera system control part 281. The image blur correction operation is an operation of performing drive control to drive (move or rotate) the image pickup device 290 in a plane orthogonal to the optical axis 299.

Next, operation of each part of the image pickup apparatus 1 configured as described above will be described.

Light from the subject comes via the image pickup optical system 274 and the shutter mechanism part 289 and forms an image on an imaging surface of the image pickup device 290. The image pickup apparatus 1 acquires a focus evaluation amount and an exposure amount based on a signal from the image pickup device 290, and executes optical adjustment processing of the image pickup optical system 274 based on information such as the acquired focus evaluation amount and exposure amount. That is, after the image pickup device 290 is properly exposed by the optical adjustment processing, an imaging signal corresponding to the subject image is output from the image pickup device 290.

The shutter mechanism part 289 performs light shielding control to shield the image pickup device 290 by causing a shutter curtain to travel. The shutter mechanism part 289 includes a mechanical rear curtain (not shown) as a light shielding member, and exposure to the image pickup device 290 is completed by causing the mechanical rear curtain to travel. In the image pickup device 290, electronic front curtain processing is performed prior to traveling of the mechanical rear curtain traveling of the shutter mechanism part 289. The electronic front curtain processing is a process of controlling exposure start timing by resetting electric charge for each line. In the electronic front curtain mode, an exposure control for exposing the image pickup device 290 is performed by synchronizing the reset operation of the electric charge of the image pickup device 290 with the movement of the mechanical rear curtain of the shutter mechanism part 289.

Furthermore, the shutter mechanism part 289 is configured to selectively shift to a silent shooting mode, which is to "perform electronic rear curtain processing without causing the mechanical rear curtain to travel", different from the mode of the normal shutter curtain traveling described above (normal shooting mode). In the silent shooting mode, since the shutter mechanism part 289 performs the electronic rear curtain processing without traveling the mechanical rear curtain, it is possible to perform silent shooting with a shutter operating sound (hereinafter, simply referred to as a "shutter sound") smaller than a normal shutter sound. The normal shooting mode corresponds to a first shooting mode, and the silent shooting mode corresponds to a second shooting mode. The mode in the image pickup apparatus 1 is selectable from a first shooting mode and a second shooting mode having a shutter operating sound smaller than that of the first shooting mode. When detecting a user operation, which is the fact that the user has selected the silent shooting mode using the operation member (hereinafter, simply referred to as a "silent shooting mode selection operation"), the operation detection part 286 outputs a silent shooting mode signal corresponding to the said operation to the camera system control part 281. The camera system control part 281 performs the silent shooting mode control of the shutter mechanism part 289 according to the silent shooting mode signal output from the operation detection part 286. It should be noted that, since a technique related to an electronic front and rear curtain is known, detailed description of electronic front curtain processing, electronic rear curtain processing, and the like is omitted.

The image processing part 283 includes an A/D converter (not shown), a white balance adjustment circuit (not shown), a gamma correction circuit (not shown), and an interpolation operation circuit (not shown). For example, the image processing part 283 generates color image data by applying color interpolation processing (demosaicing processing) to the raw image signal of the Bayer array acquired from the image pickup device 290, and outputs the generated color image data to the storage part 284 as image data for recording. Furthermore, the image processing part 283 is configured to compress the image data (still image data, and moving image data) according to the image storage format.

The sound control part 282 compresses voice data recorded by the sound collecting member (microphone). The sound control part 282 is configured to be able to adjust (change) the sound collecting sensitivity of the sound collecting member (microphone). The sound control part 282 is able to adjust (change) the volume level of the voice data recorded by the sound collecting member (hereinafter, simply referred to as a "recording sound volume level") by adjusting the sound collecting sensitivity of the sound collecting member.

The image processing part 283, as a synthesizing unit, acquires sound accompanying image data by performing synthesis processing of synthesizing the voice data compressed by the sound control part 282 with image data (still image data or moving image data), and outputs the acquired sound accompanying image data to the storage part 284. The camera system control part 281, as a synthesis processing control unit, controls the image processing part 283 to perform the synthesizing processing (that is, a process of adding voice data to image data). The storage part 284, as a recording unit, records (stores) various data including image data and sound accompanying image data, various information including image information, and the like. The storage part 284 may be configured with a nonvolatile memory. The camera system control part 281 performs a recording process of "recording various data including image data, various information including image information, and the like in the storage part 284", and a first-display-part display process of "outputting image data read from the storage part 284 to the first display part 285 and displaying that image data". In the case where the first-display-part display process has been performed, when the eye approach detection part 292 outputs the user eye approach detection signal to the camera system control part 281, the camera system control part 281 stops the first-display-part display process and performs a second-display-part display process to switch the display destination of the image data. That is the camera system control part 281, as a display destination change control unit, performs control to change the display destination of the image data according to the presence or absence of the user eye approach detection signal (the detection result by the eye approach detection part 292 as an eye approach detection unit). Incidentally, the second-display-part display process is a process of outputting the image data read from the storage part 284 to the second display part 291 to display the image data. That is, the second-display-part display process is a process of outputting the image data which has been displayed on the first display part 285 to the second display part 291 to display the image data on it.

It should be noted that the first display part 285 in FIG. 2 corresponds to the display part 2 in FIG. 1B, and functions as a first display unit. The second display part 291 in FIG. 2 corresponds to the EVF 22 in FIG. 1B, and functions as a second display unit. Further, the eye approach detection part 292 in FIG. 2 corresponds to the eye approach detection part 23 in FIG. 1B.

In accordance with a user operation signal output from the operation detection part 286, the camera system control part 281 controls various operations and various processes based on a user instruction, such as a shooting operation of shooting an image and a display process of reproducing and displaying the recorded image data.

Here, the operation of each part of the image pickup apparatus 1 in a case where the operation detection part 286 detects the user operation reflecting the shooting instruction (hereinafter, simply referred to as a "shooting instruction operation") will be described. The shooting instruction operation is an operation performed by the user using the operation member of the image pickup apparatus 1, and may be, for example, pressing operation of the shutter button 5 by the user or pressing operation of the moving image button 14 by the user. The shutter button 5 is configured with a push-button-type two-stage switch (a first switch and a second switch). An operation of lightly pressing the shutter button 5 is referred to as a "half-pressing operation", and an operation of further pressing the shutter button 5 to the end is referred to as a "full-pressing operation". That is, the half-pressing operation is an operation to turn on the first switch (hereinafter, simply referred to as "first switch operation"), and the full-pressing operation is an operation to turn on the second switch (hereinafter, simply referred to as "second switch operation"). When detecting the shooting instruction operation, the operation detection part 286 outputs a shooting instruction signal corresponding to the said shooting instruction operation to the camera system control part 281.

Hereinafter, the operation of each part of the image pickup apparatus 1 when the operation detection part 286 detects the pressing operation of the shutter button 5 by the user will be described. The first switch is turned on by the first switch operation on the shutter button 5. Further, the second switch is turned on by the second switch operation on the shutter button 5. When receiving the shooting instruction signal according to the second switch operation output from the operation detection part 286, the camera system control part 281 performs control such as drive control of the image pickup device 290 by the blur correction part 288 and image processing and image data compression processing performed by the image processing part 283. Furthermore, the camera system control part 281 performs control to display various types of information and the like including image information on a display screen of the first display part 285. When detecting an operation on the operation surface of the first display part 285 (that is, the touch panel 3 of the display part 2 in FIG. 1B) by the user, the operation detection part 286 outputs a user operation signal corresponding to the detected operation to the camera system control part 281.

The camera system control part 281 calculates an appropriate focal position and an appropriate diaphragm value based on a signal from the image pickup device 290. That is, the camera system control part 281 detects photometry and a focus state on the basis of a signal from the image pickup device 290, and determines, for example, an aperture value (F value), a shutter speed, and the like as exposure conditions. The camera system control part 281 performs exposure control of the image pickup device 290 by diaphragm control and/or shutter control. The camera system control part 281 transmits a control command signal to the lens system control part 272 via the communication terminal 220. The lens system control part 272 controls the lens drive part 273 according to the control command signal from the camera system control part 281.

The camera system control part 281 controls, according to the shooting instruction operation, a shooting operation for performing still image shooting or moving image shooting by controlling an operation of each part of the image pickup apparatus 1. That is, when the operation detection part 286 detects the shooting instruction operation, the camera system control part 281 controls the shooting operation of performing still image shooting or moving image shooting according to the shooting instruction signal output from the operation detection part 286. The camera system control part 281 calculates a target value on the basis of the blur detection signal output from the blur detection part 287, and drives the blur correction part 288 on the basis of the calculated target value. That is, the camera system control part 281 is responsible for calculating the target value based on the blur detection signal and for controlling the drive control by the blur correction part 288. Incidentally, "controlling the drive control by the blur correction part 288" performed by the camera system control part 281 is to control, according to a shooting condition, an exposure condition, and the like, the image blur correction operation performed by the blur correction part 288.

Here, a flow of the drive control by the blur correction part 288 will be described. When the operation detection part 286 detects the first switch operation by the user, an imaging preparation operation is started under the control of the camera system control part 281. During an operation to determine a composition, that is, during a so-called aiming operation, an image blur correction operation is performed by the blur correction part 288 in order to facilitate user's composition determination. That is, the image pickup device 290 is driven (moved or rotated) by the drive control performed by the blur correction part 288 on the basis of the blur detection signal from the blur detection part 287. Thereafter, when the operation detection part 286 detects the second switch operation by the user, the shooting operation (image recording operation) is started under the control of the camera system control part 281. At this time, in order to correct the image blur of the subject image acquired by the exposure operation, the camera system control part 281 drives the image pickup device 290 to perform the image blur correction operation by controlling the blur correction part 288 on the basis of the blur detection signal from the blur detection part 287. When a certain period of time has elapsed after the exposure, the camera system control part 281 controls the blur correction part 288 to stop the image blur correction operation.

Next, an operation of the image pickup apparatus 1 according to the first embodiment will be described. FIG. 3 is a flowchart showing an operation of the image pickup apparatus 1 according to the first embodiment. It should be noted that in the following description, "S" means a "step".

First, in S301, in the image pickup apparatus 1, when detecting that the "playback button 17 is pressed" (hereinafter, simply referred to as a "playback button pressing operation"), the operation detection part 286 outputs an operation signal corresponding to the detected playback button pressing operation to the camera system control part 281. Hereinafter, the operation signal corresponding to the playback button pressing operation is simply referred to as a "playback button pressing operation signal".

Next, in S302, the camera system control part 281 which has received a playback button pressing operation signal, determines whether or not to shift to the playback mode for reproducing and displaying image data, and when determining to shift to the playback mode, proceeds the processing to S303. On the other hand, when in S302 determining not to shift to the playback mode, that is, when determining that the mode is not the playback mode, the camera system control part 281 ends the processing.

In S303, the eye approach detection part 292 determines whether or not the user's eye approach has been detected. When determining that the user's eye approach has been detected (hereinafter, it is referred to as a "user's eye approach detection state"), the eye approach detection part 292 outputs a user's eye approach detection signal indicating a user's eye approach detection state, which is a detection result by the eye approach detection part 292, to the camera system control part 281, and the process proceeds to S304. At this time, since the detection result by the eye approach detection part 292 is the "user's eye approach detection state", the user posture is a posture looking into the second display part 291.

In S304, the camera system control part 281 which has received the user's eye approach detection signal, performs the second-display-part display process of reproducing and displaying the image data on the second display part 291, whereby the user can confirm the image data reproduced and displayed on the second display part 291. That is, the image confirmation posture of the user is a posture by which the user is confirming the image data in a state where the image pickup apparatus 1 and the user's face are close to each other (hereinafter, it is also referred to as an "image confirmation posture in a proximity state"). When the image data is reproduced and displayed on the second display part 291 (EVF 22), the camera system control part 281 proceeds the processing to S305.

In S305, the operation detection part 286 detects whether or not the voice recording button 18 has been pressed, that is, determines whether or not the user has performed a voice recording button pressing operation. When detecting that the voice recording button 18 has been pressed, the operation detection part 286 outputs an operation signal corresponding to the voice recording button pressing operation (hereinafter, referred to as a "voice memo recording operation signal") to the camera system control part 281, and the processing proceeds to S306. On the other hand, if in S305 the operation detection part 286 does not detect that the voice recording button 18 is pressed, that is, if it is determined that the voice recording button pressing operation is not performed, the camera system control part 281 ends the processing.

In S306, the camera system control part 281 which has received the voice memo recording operation signal, causes the sound control part 282 to perform a first sound collecting sensitivity adjustment process of lowering the sound collecting sensitivity (recording sound volume level) of a user voice recording microphone 530, and then proceeds the process to S307. In S306, the camera system control part 281 functions as a first sound collecting sensitivity adjustment control unit, and controls to cause the sound control part 282 as a sound collecting sensitivity adjustment unit to perform a first sound collecting sensitivity adjustment process. The first sound collecting sensitivity adjustment process is a process of lowering the recording sound volume level by a first predetermined ratio (which is one value within, for example, between 10% and 30%) as compared with the recording sound volume level at which the user starts recording a voice memo in a state where the user's face is separated from the image pickup apparatus 1 (that is, in the case of YES in S309 to be described later).

In S307, the camera system control part 281 controls to start voice memo recording. While keeping pressing the voice recording button 18, the user can record the user's own voice while visually recognizing the image (image data) reproduced and displayed on the second display part 291 (EVF 22). That is, the voice recording button 18 functions, while being pressed, as an execution unit that performs voice memo recording (user's voice recording by the user voice recording microphone 530). When the user releases the voice recording button 18, the camera system control part 281 controls to end the voice memo recording.

On the other hand, if the eye approach detection part 292 determines that the user's eye approach has not been detected (hereinafter, referred to as a "user's eye approach non-detection state") in S303, the detection result by the eye approach detection part 292 is the user's eye approach non-detection state, and thus the process proceeds to S308. At this time, since the detection result by the eye approach detection part 292 indicates the user's eye approach non-detection state, the user posture is a posture in which the face is separated from the image pickup apparatus 1.

In S308, the camera system control part 281 performs the first-display-part display processing of reproducing and displaying the image data on the first display part 285, which enables the user to confirm the image data reproduced and displayed on the first display part 285. That is, the image confirmation posture of the user is a posture of confirming the image data in a state where the face is separated from the image pickup apparatus 1 (hereinafter, also referred to as "image confirmation posture in a separated state"). When the image data is reproduced and displayed on the first display part 285 (display part 2), the camera system control part 281 proceeds the processing to S309.

In S309, the operation detection part 286 detects whether or not the voice recording button 18 has been pressed, that is, determines whether or not the user has performed the voice recording button pressing operation. If the operation detection part 286 detects that the voice recording button 18 has been pressed, the camera system control part 281 proceeds the processing to S307 and performs control to start voice memo recording. While keeping pressing the voice recording button 18, the user can record the user's own voice while visually recognizing the image (image data) reproduced and displayed on the first display part 285 (display part 2). When the user releases the voice recording button 18, the camera system control part 281 controls to end the voice memo recording.

On the other hand, if in S309 the operation detection part 286 does not detect that the voice recording button 18 is pressed, that is, if it is determined that the voice recording button pressing operation is not performed, the camera system control part 281 ends the processing.

As described above, even if the user performs voice memo recording by uttering with a constant volume (utterance volume) in a state where the image pickup apparatus 1 and the face of the user are close to each other, since the process of lowering the recording sound volume level was already performed before recording, the recording sound volume level is substantially equivalent to that in a state where the face is separated from the image pickup apparatus 1. The process of lowering the recording sound volume level is the first sound collecting sensitivity adjustment process of S306. Therefore, even if the user performs voice memo recording with a constant utterance volume, it is possible to reduce variations in recording volume regardless of the image confirmation posture of the user.

It should be noted that the user may arbitrarily adjust the recording sound volume level in the first sound collecting sensitivity adjustment process performed in S306 using the operation member of the image pickup apparatus 1. In addition, the adjustment ratio of the recording sound volume level (that is, the first predetermined ratio for lowering the recording sound volume level) in the first sound collecting sensitivity adjustment process is not limited to the ratio from 10% to 30% described above.

In the first embodiment, the user voice recording microphone 530 is provided on the back surface of the image pickup apparatus 1. However, as long as the user voice can be collected, the user voice recording microphone 530 may be disposed on, for example, an upper surface, a front surface, a side surface, or the like of the image pickup apparatus 1. In the first embodiment, the user voice recording microphone 530 is used as a sound collecting unit (sound collecting member) for recording the user's voice. However, as long as the user voice can be collected, for example, the subject voice recording microphone 520 may be used as a sound collecting member for recording the subject's voice.

Second Embodiment

Hereinafter, a second embodiment of the present disclosure will be described.

Since the configuration of an image pickup apparatus according to the second embodiment of the present disclosure is the same as the configuration of the image pickup apparatus 1 according to the first embodiment shown in FIGS. 1A, 1B, and 2, the description thereof will be omitted.

Here, the operation of the image pickup apparatus 1 according to the second embodiment will be described referring to each part of the image pickup apparatus 1. FIG. 4 is a flowchart showing an operation of the image pickup apparatus 1 according to the second embodiment of the present disclosure.

First, in S400, when the operation detection part 286 detects the shooting instruction operation, the camera system control part 281 controls the shooting operation to cause the image pickup apparatus 1 to shoot an image according to a shooting instruction signal output from the operation detection part 286, and proceeds the processing to S401. In S401, when detecting a playback button pressing operation, the operation detection part 286 outputs a playback button pressing operation signal to the camera system control part 281.

Next, in S402, the camera system control part 281 which has received the playback button pressing operation signal, determines whether or not to shift to the playback mode for reproducing and displaying image data, and when determining to shift to the playback mode, proceeds the processing to S403. On the other hand, when determining not to shift to the playback mode in S402, the camera system control part 281 ends the processing.

In S403, the operation detection part 286 detects whether the voice recording button 18 has been pressed. When detecting that the voice recording button 18 is pressed, the operation detection part 286 outputs a voice memo recording operation signal to the camera system control part 281, and the processing proceeds to S404. On the other hand, in S403, if the operation detection part 286 has not detected that the voice recording button 18 has been pressed, the camera system control part 281 ends the processing.

In S404, the camera system control part 281 determines whether or not the image shooting performed in S400 is shooting performed in the silent shooting mode (hereinafter, it is referred to as "silent shooting"). As described above, the shutter sound in the silent shooting mode is smaller than the shutter sound in the normal shooting mode. In S404, when determining that the image shooting performed in S400 is not silent shooting, the camera system control part 281 proceeds the processing to S406, and performs control to start voice memo recording. The user can record user's own voice while keeping pressing the voice recording button 18. When the user releases the voice recording button 18, the camera system control part 281 controls to end the voice memo recording.

On the other hand, in S404, when determining that the image shooting performed in S400 is silent shooting, the camera system control part 281 proceeds the processing to S405. In S405, the camera system control part 281 which has received the voice memo recording operation signal, causes the sound control part 282 to perform a second sound collecting sensitivity adjustment process of increasing the sound collecting sensitivity (recording sound volume level) of the user voice recording microphone 530, and then proceeds the processing to S406. In S405, the camera system control part 281 functions as a second sound collecting sensitivity adjustment control unit, and performs control to cause the sound control part 282 as a sound collecting sensitivity adjustment unit to perform the second sound collecting sensitivity adjustment process. The second sound collecting sensitivity adjustment process is a process of increasing the recording sound volume level by a second predetermined ratio (which is one value within, for example, between 10% and 30%) as compared with the recording sound volume level at which voice memo recording is started in a case where it is determined that the image shooting in S400 is not silent shooting (that is, in the case of NO in S404).

In S406, the camera system control part 281 controls to start voice memo recording. The user can record user's own voice while keeping pressing the voice recording button 18.

When the user releases the voice recording button 18, the camera system control part 281 controls to end the voice memo recording.

As described above, in a case where the user desires to use the voice memo function in a scene where silent shooting has been performed, since the process of increasing the recording sound volume level (the second sound collecting sensitivity adjustment process of S405) was already performed before recording, the recording sound volume level increases even if the user utters a small voice. Therefore, even if the user performs voice memo recording in a state where the utterance volume is lowered in consideration of the surroundings in a scene where silent shooting is performed (that is, a scene where it is not desired to make a large sound), it is possible to reduce variations in recording volume.

It should be noted that the user may arbitrarily adjust the recording sound volume level in the second sound collecting sensitivity adjustment process performed in S405 using the operation member of the image pickup apparatus 1. In addition, the adjustment ratio of the recording sound volume level (that is, the second predetermined ratio for increasing the recording sound volume level) in the second sound collecting sensitivity adjustment process is not limited to the ratio from 10% to 30% described above.

Also in the second embodiment, the user voice recording microphone 530 is provided on the back surface of the image pickup apparatus 1. However, as long as the user voice can be collected, the user voice recording microphone 530 may be disposed on, for example, the upper surface, the front surface, the side surface, or the like of the image pickup apparatus 1. Also in the second embodiment, the user voice recording microphone 530 is used as a sound collecting unit (sound collecting member) for recording the user's voice. However, as long as the user voice can be collected, for example, the subject voice recording microphone 520 may be used as a sound collecting member for recording the subject's voice.

Third Embodiment

Hereinafter, a third embodiment of the present disclosure will be described.

Since the configuration of an image pickup apparatus according to the third embodiment of the present disclosure is also the same as the configuration of the image pickup apparatus 1 according to the first embodiment shown in FIGS. 1A, 1B, and 2, the description thereof will be omitted.

Here, the operation of the image pickup apparatus 1 according to the third embodiment will be described referring to each part of the image pickup apparatus 1. FIG. 5 is a flowchart showing an operation of the image pickup apparatus 1 according to the third embodiment of the present disclosure.

First, in S500, when the operation detection part 286 detects the shooting instruction operation, the camera system control part 281 controls the shooting operation to cause the image pickup apparatus 1 to shoot an image according to the shooting instruction signal output from the operation detection part 286, and proceeds the processing to S501. In S501, when detecting the playback button pressing operation, the operation detection part 286 outputs a playback button pressing operation signal to the camera system control part 281.

Next, in S502, the camera system control part 281 which has received the playback button pressing operation signal, determines whether or not to shift to the playback mode for reproducing and displaying image data, and when determining to shift to the playback mode, proceeds the processing to S503. On the other hand, when determining not to shift to the playback mode in S502, the camera system control part 281 ends the processing.

In S503, the eye approach detection part 292 determines whether or not the user's eye approach has been detected. When determining that the state is the user's eye approach detection state, the eye approach detection part 292 outputs a user's eye approach detection signal indicating the user's eye approach detection state, which is a detection result by the eye approach detection part 292, to the camera system control part 281, and the process proceeds to S504. At this time, since the detection result by the eye approach detection part 292 is the "user's eye approach detection state", the user posture is a posture looking into the second display part 291.

In S504, the camera system control part 281 which has received the user's eye approach detection signal, performs the second-display-part display process of reproducing and displaying the image data on the second display part 291, whereby the user can confirm the image data reproduced and displayed on the second display part 291. That is, the image confirmation posture of the user is the "image confirmation posture in the proximity state". When the image data is reproduced and displayed on the second display part 291 (EVF 22), the camera system control part 281 proceeds the processing to S505.

In S505, the operation detection part 286 detects whether or not the voice recording button 18 has been pressed, that is, determines whether or not the user has performed a voice recording button pressing operation. When detecting that the voice recording button 18 is pressed, the operation detection part 286 outputs a voice memo recording operation signal to the camera system control part 281, and the processing proceeds to S506. On the other hand, if in S505 the operation detection part 286 does not detect that the voice recording button 18 is pressed, that is, if it is determined that the voice recording button pressing operation is not performed, the camera system control part 281 ends the processing.

In S506, the camera system control part 281 determines whether or not the image shooting performed in S500 is silent shooting. When determining that the image shooting performed in S500 is silent shooting, the camera system control part 281 proceeds the processing to S507.

In S507, the camera system control part 281 which has received the voice memo recording operation signal, causes the sound control part 282 to perform a third sound collecting sensitivity adjustment process of increasing the sound collecting sensitivity (recording sound volume level) of the user voice recording microphone 530, and then proceeds the processing to S513. In S507, the camera system control part 281 functions as a third sound collecting sensitivity adjustment control unit, and performs control to cause the sound control part 282 as a sound collecting sensitivity adjustment unit to perform the third sound collecting sensitivity adjustment process. The third sound collecting sensitivity adjustment process is a process of increasing the recording sound volume level by a third predetermined ratio as compared with the recording sound volume level at which voice memo recording is started in a case where the user's face is separated from the image pickup apparatus 1 and it is determined that the image shooting in S500 is not silent shooting (that is, in the case of NO in S511). The third predetermined ratio for increasing the recording sound volume level is one value within, for example, from 10% to 20%.

On the other hand, in S506, when determining that the image shooting performed in S500 is not silent shooting, the camera system control part 281 proceeds the processing to S508.

In S508, the camera system control part 281 which has received the voice memo recording operation signal, causes the sound control part 282 to perform a fourth sound collecting sensitivity adjustment process of lowering the sound collecting sensitivity (recording sound volume level) of the user voice recording microphone 530, and then proceeds the process to S513. In S508, the camera system control part 281 functions as a fourth sound collecting sensitivity adjustment control unit, and controls to cause the sound control part 282 as a sound collecting sensitivity adjustment unit to perform the fourth sound collecting sensitivity adjustment process. The fourth sound collecting sensitivity adjustment process is a process of lowering the recording sound volume level by a fourth predetermined ratio as compared with the recording sound volume level at which the voice memo recording is started in a case where the user's face is separated from the image pickup apparatus 1 and it is determined that the image shooting in S500 is not silent shooting (that is, in the case of NO in S511). The fourth predetermined ratio for lowering the recording sound volume level is one value within, for example, from 10% to 30%.

In S513, the camera system control part 281 controls to start voice memo recording. In both a case where the processing proceeds to S513 after S507 and a case where the processing proceeds to S513 after S508, the user can record the user's own voice while visually recognizing the image reproduced and displayed on the second display part 291 while keeping pressing the voice recording button 18. When the user releases the voice recording button 18, the camera system control part 281 controls to end the voice memo recording.

The description returns to S503. When the eye approach detection part 292 determines the user's eye approach non-detection state in S503, the detection result by the eye approach detection part 292 is the user's eye approach non-detection state, and thus the process proceeds to S509. At this time, since the detection result by the eye approach detection part 292 indicates the user's eye approach non-detection state, the user posture is a posture in which the face is separated from the image pickup apparatus 1.

In S509, the camera system control part 281 performs a first-display-part display processing of reproducing and displaying the image data on the first display part 285, which enables the user to confirm the image data reproduced and displayed on the first display part 285. That is, the image confirmation posture of the user is the image confirmation posture in the separated state. When the image data is reproduced and displayed on the first display part 285 (display part 2), the camera system control part 281 proceeds the processing to S510.

In S510, the operation detection part 286 detects whether or not the voice recording button 18 has been pressed. In a case where the operation detection part 286 detects that the voice recording button 18 has been pressed, the camera system control part 281 proceeds the processing to S511. On the other hand, in S510, when the operation detection part 286 has not detected that the voice recording button 18 has been pressed, the camera system control part 281 ends the processing.

In S511, the camera system control part 281 determines whether or not the image shooting performed in S500 is silent shooting. When determining that the image shooting performed in S500 is silent shooting, the camera system control part 281 proceeds the processing to S512.

In S512, the camera system control part 281 which has received the voice memo recording operation signal, causes the sound control part 282 to perform a fifth sound collecting sensitivity adjustment process of increasing the sound collecting sensitivity (recording sound volume level) of the user voice recording microphone 530, and then proceeds the processing to S513. In S512, the camera system control part 281 functions as a fifth sound collecting sensitivity adjustment control unit, and performs control to cause the sound control part 282 as a sound collecting sensitivity adjustment unit to perform the fifth sound collecting sensitivity adjustment process. The fifth sound collecting sensitivity adjustment process is a process of increasing the recording sound volume level by a fifth predetermined ratio as compared with the recording sound volume level at which the voice memo recording is started in a case where the user's face is separated from the image pickup apparatus 1 and it is determined that the image shooting in S500 is not silent shooting (that is, in the case of NO in S511). The fifth predetermined ratio for increasing the recording sound volume level is one value within, for example, from 20% to 30%. The fifth predetermined ratio for increasing the recording sound volume level is set so as to be larger than the third predetermined ratio for increasing the recording sound volume level.

In S511, when determining that the image shooting performed in S500 is not silent shooting, the camera system control part 281 proceeds the processing to S513 and performs control to start voice memo recording. In both the case where the processing proceeds to S513 after S511 and the case where the processing proceeds to S513 after S512, the user can record the user's own voice while visually recognizing the image reproduced and displayed on the first display part 285 while keeping pressing the voice recording button 18. When the user releases the voice recording button 18, the camera system control part 281 controls to end the voice memo recording.

As described above, in a case where the user desires to use the voice memo function in a scene where silent shooting has been performed, since the third sound collecting sensitivity adjustment process of S507 or the fifth sound collecting sensitivity adjustment process of S512 was already performed before recording, the recording sound volume level increases even if the user utters a small voice. Both the third sound collecting sensitivity adjustment process of S507 and the fifth sound collecting sensitivity adjustment process of S512 are processes of increasing the recording sound volume level.

Furthermore, in a case where the user desires to use the voice memo function in a situation where the silent shooting is performed and when the user's face is separated from the image pickup apparatus 1, since the processing of increasing the recording sound volume level was already performed before recording, the recording sound volume level increases even if the user utters a small voice. The process which increases the recording sound volume level more greatly is the fifth sound collecting sensitivity adjustment process at S512. As described above, since the fifth predetermined ratio is set so as to be larger than the third predetermined ratio, the fifth sound collecting sensitivity adjustment process can more greatly increase the recording sound volume level than that of the third sound collecting sensitivity adjustment process.

Therefore, even if the user performs voice memo recording in a state where the utterance volume is lowered in consideration of the surroundings in a scene where silent shooting is performed (that is, a scene where it is not desired to make a large sound), it is possible to reduce variations in recording volume.

Furthermore, even if the user performs voice memo recording with a constant utterance volume in a state where the image pickup apparatus 1 and the face of the user are close to each other, since the process of lowering the recording sound volume level was already performed before recording, the recording sound volume level is substantially equivalent to that in a state where the face is separated from the image pickup apparatus 1. The process of lowering the recording sound volume level is the fourth sound collecting sensitivity adjustment process of S508. Therefore, even if the user performs voice memo recording with a constant utterance volume, it is possible to reduce variations in recording volume regardless of the image confirmation posture of the user.

It should be noted that the user may arbitrarily adjust the recording sound volume level in each of the third sound collecting sensitivity adjustment process in S507, the fourth sound collecting sensitivity adjustment process in S508, and the fifth sound collecting sensitivity adjustment process in S512 using the operation member of the image pickup apparatus 1. In addition, the adjustment rate of the recording sound volume level in the third sound collecting sensitivity adjustment process (that is, the third predetermined ratio for increasing the recording sound volume level) is not limited to the rate from 10% to 20% described above. The adjustment ratio of the recording sound volume level in the fourth sound collecting sensitivity adjustment process (that is, the fourth predetermined ratio for lowering the recording sound volume level) is not limited to the ratio from 10% to 301% described above. The adjustment ratio of the recording sound volume level in the fifth sound collecting sensitivity adjustment process (that is, the fifth predetermined ratio for increasing the recording sound volume level) is not limited to the ratio from 20% to 30% described above.

Also in the third embodiment, the user voice recording microphone 530 is provided on the back surface of the image pickup apparatus 1. However, as long as the user voice can be collected, the user voice recording microphone 530 may be disposed on, for example, the upper surface, the front surface, the side surface, or the like of the image pickup apparatus 1. Also in the third embodiment, the user voice recording microphone 530 is used as a sound collecting unit (sound collecting member) for recording the user's voice. However, as long as the user's voice can be collected, for example, the subject voice recording microphone 520 may be used as a sound collecting member for recording the subject's voice.

The preferred embodiments of the present disclosure have been described above. It should be noted that the image pickup apparatus according to the embodiments of the present disclosure can also be applied to a mobile terminal such as a smartphone or a tablet terminal with a camera function, an image pickup apparatus such as a digital video camera, a digital audio player with an image reproduction function, or the like.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-065268, filed Apr. 7, 2021, which is hereby incorporated by reference wherein in its entirety.

What is claimed is:

1. An image pickup apparatus, comprising:
a first display part;
a second display part;
an eye approach detection part configured to detect user's eye approach which means that a user looks into the second display part and the user's eye approaches the second display part;
a sound collecting member configured to collect and record a voice of the user;
a start member operable by the user to start and execute voice recording by the sound collecting member;
at least one memory that stores a set of instructions; and
at least one processor that is configured to, based on the instructions, perform to:
determine a display destination of image data according to a detection result of the eye approach detection part;
perform synthesis processing of adding voice data recorded by the sound collecting member to the image data; and
start and execute voice recording by the sound collecting member in response to an instruction by a user operation on the start member,
wherein in a case where user's eye approach is detected by the eye approach detection part and the image data is displayed on the second display part, when the voice recording is started by the user operation on the start member, the at least one processor performs a first sound collecting sensitivity adjustment process of adjusting a sound collecting sensitivity of the sound collecting member.

2. The image pickup apparatus according to claim 1, wherein in the first sound collecting sensitivity adjustment process, a recording sound volume level of the sound collecting member is lowered by a first predetermined ratio.

3. The image pickup apparatus according to claim 1, wherein the second display part is an electronic viewfinder.

4. The image pickup apparatus according to claim 1, wherein the eye approach detection part is disposed near the second display part.

5. The image pickup apparatus according to claim 1, wherein the sound collecting member is disposed on a back surface of the image pickup apparatus.

6. A control method for controlling an image pickup apparatus,
the image pickup apparatus comprising:
a first display part;
a second display part;
an eye approach detection part configured to detect user's eye approach which means that a user looks into the second display part and the user's eye approaches the second display part;
a sound collecting member configured to collect and record a voice of the user; and
a start member operable by the user to start and execute voice recording by the sound collecting member, and
the control method comprising:
determining a display destination of image data according to a detection result of the eye approach detection part;
performing synthesis processing of adding voice data recorded by the sound collecting member to the image data; and
in a case where user's eye approach is detected by the eye approach detection part and the image data is displayed on the second display part, when the voice recording is started by the user operation on the start member, performing first sound collecting sensitivity adjustment processing of adjusting a sound collecting sensitivity of the sound collecting member.

7. A non-transitory computer-readable storage medium storing a program for causing a computer to execute a control method for controlling an image pickup apparatus, wherein the image pickup apparatus comprises a first display part, a second display part, an eye approach detection part configured to detect user's eye approach which means that a user looks into the second display part and the user's eye approaches the second display part, a sound collecting member configured to collect and record a voice of the user, and a start member operable by the user to start and execute voice recording by the sound collecting member,
the control method comprising:
determining a display destination of image data according to a detection result of the eye approach detection part;
performing synthesis processing of adding voice data recorded by the sound collecting member to the image data; and
in a case where user's eye approach is detected by the eye approach detection part and the image data is displayed on the second display part, when the voice recording is started by the user operation on the start member, performing first sound collecting sensitivity adjustment processing of adjusting a sound collecting sensitivity of the sound collecting member.

* * * * *